United States Patent
Paulsen et al.

(10) Patent No.: US 10,330,816 B2
(45) Date of Patent: Jun. 25, 2019

(54) IMAGING SUBTERRANEAN FORMATIONS AND FEATURES USING AZIMUTHAL PHASE ENCODING

(71) Applicant: Schlumberger Technology Corporation, Sugar Land, TX (US)

(72) Inventors: Jeffrey L. Paulsen, Boston, MA (US); Yi-Qiao Song, Newton Center, MA (US); Lalitha Venkataramanan, Lexington, MA (US); Robert Callan, New York, NY (US)

( * ) Notice: Subject to any disclaimer, the term of this patent is extended or adjusted under 35 U.S.C. 154(b) by 555 days.

(21) Appl. No.: 14/975,656

(22) Filed: Dec. 18, 2015

(65) Prior Publication Data

US 2017/0176628 A1 Jun. 22, 2017

(51) Int. Cl.
*G01V 3/32* (2006.01)
*G01V 3/38* (2006.01)

(52) U.S. Cl.
CPC . *G01V 3/32* (2013.01); *G01V 3/38* (2013.01)

(58) Field of Classification Search
CPC .................................. G01V 3/32; G01V 3/38
USPC ....................................................... 324/303
See application file for complete search history.

(56) References Cited

U.S. PATENT DOCUMENTS

| 4,689,566 | A | * | 8/1987 | Maudsley | G01R 33/446 324/309 |
|---|---|---|---|---|---|
| 4,689,567 | A | * | 8/1987 | Maudsley | G01N 24/08 324/309 |
| 5,629,623 | A | | 5/1997 | Sezginer et al. | |
| 6,236,209 | B1 | * | 5/2001 | Arz | G01R 33/385 324/309 |
| 6,326,784 | B1 | * | 12/2001 | Ganesan | G01V 3/32 324/303 |
| 2005/0132794 | A1 | * | 6/2005 | Spross | E21B 7/067 73/152.03 |
| 2013/0060474 | A1 | * | 3/2013 | Venkataramanan | G01V 3/175 702/6 |
| 2014/0253116 | A1 | * | 9/2014 | Freedman | G01R 33/30 324/303 |

* cited by examiner

*Primary Examiner* — Melissa J Koval
*Assistant Examiner* — Rahul Maini

(57) ABSTRACT

Systems and methods are provided for investigating a downhole formation using a nuclear magnetic resonance (NMR) tool. While the tool is moving through the borehole, the formation is magnetized and resulting signals are obtained. In accordance with the present approach, the acquired signals can be resolved azimuthally and/or laterally and can be reconstructed to obtain an indication of a parameter of the formation at multiple locations along the length of the borehole.

16 Claims, 14 Drawing Sheets

Δt = THE TOTAL TIME DURATION OF THE APEC PULSES

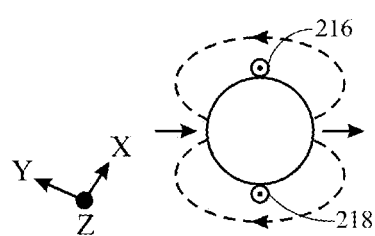
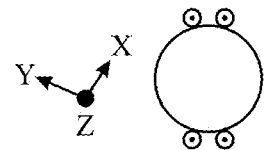
FIG. 13C    FIG. 13D
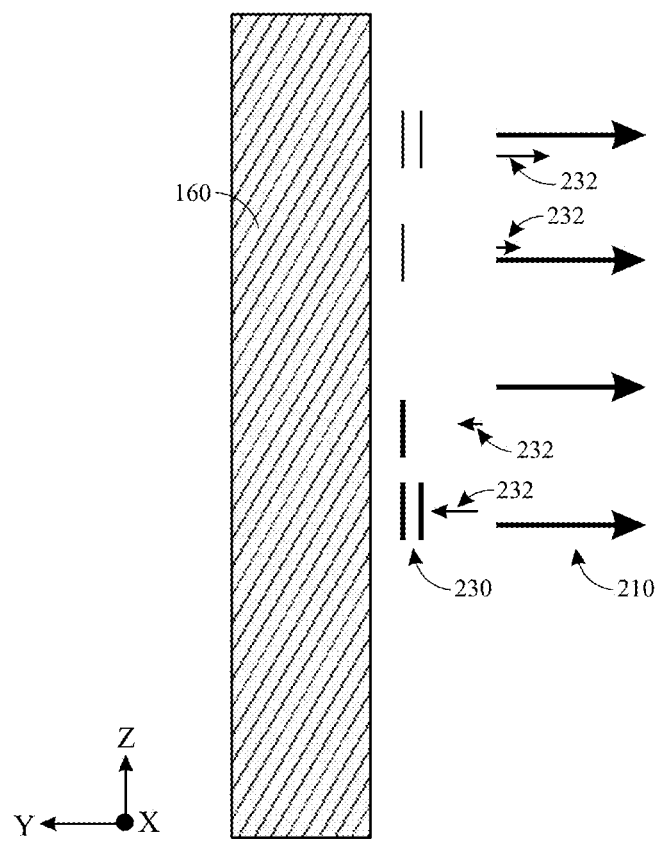
FIG. 14

IMAGING SUBTERRANEAN FORMATIONS AND FEATURES USING AZIMUTHAL PHASE ENCODING

BACKGROUND

This disclosure relates to the use of nuclear magnetic resonance (NMR) in the context of imaging subterranean formations and features. In certain embodiments, the subject matter relates to methods for facilitating azimuthal imaging using NMR in conjunction with azimuthal phase encoding in a borehole.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Magnetic resonance imaging involves the spatial localization of protons within a sample space. Nuclear Magnetic Resonance (NMR) tools used for well-logging or downhole fluid characterization measure the response of nuclear spins in formation fluids to applied magnetic fields. Downhole NMR tools typically have a permanent magnet that produces a static magnetic field at a desired test location (e.g., where the fluid is located). The static magnetic field produces a magnetization in the fluid. The magnetization is aligned along the direction of the static field. The magnitude of the induced magnetization is proportional to the magnitude of the static field. A transmitter antenna produces a time-dependent radio frequency magnetic field that has a component perpendicular to the direction of the static field. The NMR resonance condition is satisfied when the radio frequency is equal to the Larmor frequency, which is proportional to the magnitude of the static magnetic field. The radio frequency magnetic field produces a torque on the magnetization vector that causes it to rotate about the axis of the applied radio frequency field. The rotation results in the magnetization vector developing a component perpendicular to the direction of the static magnetic field. This causes the magnetization vector to precess around the static field at the Larmor frequency. At resonance between the Larmor and transmitter frequencies, the magnetization is tipped to the transverse plane (i.e., a plane normal to static magnetic field vector). A series of radio frequency pulses are applied to generate spin echoes that are measured with the antenna.

NMR measurements can be used to estimate, among other things, formation porosity and formation permeability. For example, the area under the curve of a T2 distribution for a NMR measurement equals the NMR porosity. The T2 distribution also resembles the pore size distribution in water-saturated rocks. The raw reported porosity is provided by the ratio of the initial amplitude of the raw decay and the tool response in a water tank. This porosity is independent of the lithology of the rock matrix.

The NMR estimate of permeability is based on a theoretical model such as the Free-fluid (Coates) model or the average-T2 model. The Free-fluid model can be applied in formations containing water and/or hydrocarbons, while the average-T2 model can be applied to pore systems containing water only. Measurements on core samples are generally required to refine and customize those models for local use. The NMR permeability tends to increase with both increasing porosity and increasing pore size.

Crude oil properties such as viscosity, molecular composition, gas-oil ratio, and SARA (saturates, aromatics, resins, asphaltenes) fractions are useful parameters for evaluating, for example, reservoir quality, producibility, and compartmentalization. Physical and empirical model-based equations have been developed which relate the properties of crude oils to Nuclear Magnetic Resonance (NMR) measurements. NMR response of fluids provides a link between microscopic molecular motions and macroscopic properties such as viscosity and composition. The relationship between viscosity and relaxation time of pure fluids was established by the phenomenological relaxation theory of Bloembergen, Purcell, and Pound (BPP). Brown studied proton relaxation in a suite of crude oils with various compositions and viscosities. The viscosities of the samples varied from about 0.5 to 400 cp. He found that the relaxation times showed an inverse dependence on viscosity over the entire range. Since the early work of Brown, several physical and empirical models have been proposed that relate crude oil properties to NMR response. Understanding of molecular dynamics in alkane mixture resulted in the establishment of a scale-law theory to relate NMR diffusion and relaxation properties to the molecular composition of crude oils. There are also other database approaches such as, for example, Artificial Neural Networks (ANN) and Radial Basis Function.

Characterization of reservoir fluids is useful for several aspects of reservoir development and management. For example, fluid properties such as viscosity and molecular composition are used to calculate flow rates and sweep efficiencies of secondary and tertiary recoveries. Gas-oil ratio (GOR) of reservoir fluids is an important parameter for material selection of well completion and design of surface facilities. Asphaltene and wax concentrations are key considerations for flow assurance in completions, pipelines, and surface facilities. Estimation of fluid properties at different depths in a reservoir provides indications of compositional grading and compartmentalization within the reservoir. It is useful to obtain fluid properties from measurements such as NMR well-logging which can be performed at downhole temperature and pressure conditions.

Borehole images allow one to interpret the rock record for oil and gas exploration. In addition to identifying fractures and faults, borehole imaging tools are used for a variety of other applications such as sequence stratigraphy, facies reconstruction, stratigraphy, and diagenetic analysis. They can be used in a wide variety of geological and drilling environments, providing high resolution borehole images of rock and fluid properties in formations ranging from fractured carbonates to soft, thinly laminated sand/shale sequences. These tools produce high resolution and often nearly complete borehole coverage, which may be interpreted at an interactive graphics workstation.

NMR well-logging tools differ from those commonly used in the medical field in many respects. Obviously the operating environment for a downhole tool is much harsher than the laboratory setting of an imaging facility. In addition, a downhole NMR is configured "inside-out" relative to a typical "closed" medical NMR device. That is, medical devices usually look inward to their targeted area, whereas downhole NMR devices look outward into the surrounding formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, an NMR tool is run along all or part of the length of a borehole with rotation (i.e., logging-while-drilling (LWD). Further, methods are provided for inducing spins within an imaged volume using an azimuthal phase encoding coil during an NMR acquisition, where the induced spins are encoded with an azimuth dependent phase. That is, the azimuth dependent phase conveys information about the angular direction of the spins relative to the tool in the borehole. In one embodiment, this data is analyzed in order to obtain the $T_2$ distribution profile as a function of azimuthal location along the borehole. In accordance with one aspect, the azimuthal formation data may be obtained and used in evaluating a site or operation.

BRIEF DESCRIPTION OF THE DRAWINGS

FIGS. 13A-13D depict APEC coil and field configurations, in accordance with aspects of the present disclosure; and FIG. 14 depicts a LPEC encoding coil and field configurations, in accordance with aspects of the present disclosure.

DETAILED DESCRIPTION

Figure 1:
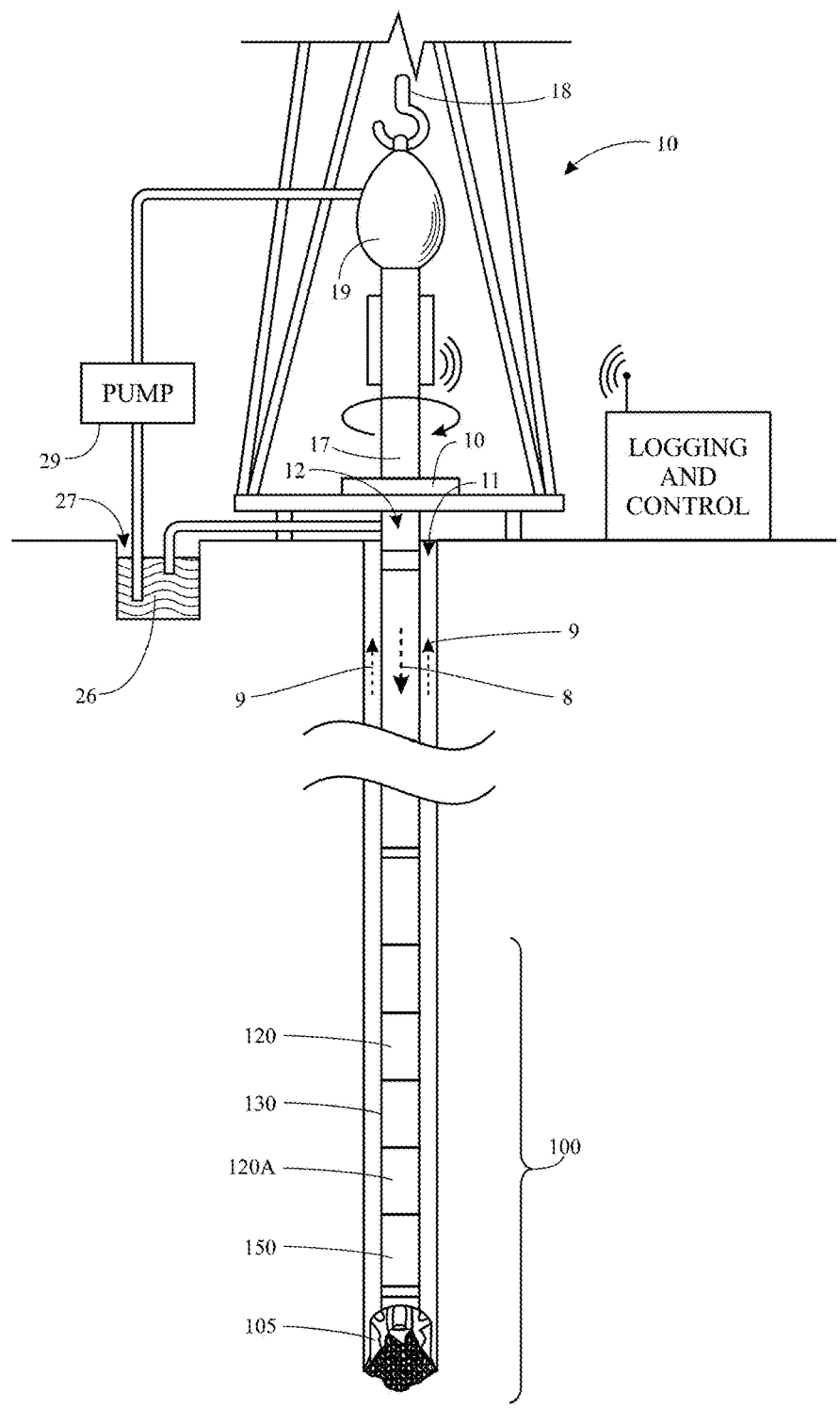
FIG. 1 illustrates an exemplary well site system.

One or more specific embodiments will be described below. The description and drawings provided demonstrate to those skilled in the art how the several forms of the subject disclosure may be embodied in practice. In an effort to provide a concise description of these embodiments, all features of an actual implementation may not be described in the specification. In this regard, no attempt is made to show details in more detail than is necessary for one skilled in the art to comprehend and practice the present approaches. It should be appreciated that in the development of an implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. Furthermore, like reference numbers and designations in the various drawings indicate like elements.

The present discussion relates to performing azimuthal imaging using nuclear magnetic resonance (NMR) measurements, typically acquired in a logging-while-drilling context. In certain embodiments, to facilitate imaging, a pattern of magnetization is induced in the surrounding formation of interest using coils that apply modulated DC pulses. The corresponding sensitivity remains fixed for each individual phase encoding.

Such approaches employ a forward model and associated inversion algorithm as part of the azimuthal imaging process and, as discussed herein, azimuthal measurements can be acquired using a variety of different kinds of antennae, including, but not limited to gradient coils which may include azimuthal phase encoding (APEC) coils in certain of the embodiments discussed herein. In certain implementations, the generalized forward model is a linear transformation of formation-dependent properties, such as the azimuth-dependent $T_2$ distribution, and is a convolution of these properties with a time-dependent kernel. The inversion algorithm is based on the deconvolution of the measured data with the known kernel after expansion into a suitable basis of orthogonal functions (such as Fourier or Haar basis).

Such azimuthal information may be useful for geo-steering and to obtain azimuth-dependent formation parameters, such as porosity, bound fluid volume, permeability and logarithmic mean $T_2$. Though subterranean imaging examples are described herein to provide useful context, in practice the present approaches can be used in various contexts.

Before providing a detailed discussion of these various embodiments, a generalized overview of certain well-site terminology and NMR concepts is provided for those unfamiliar with one or both of well-site or NMR terminology and principles. With this in mind, and turning to FIG. 1, this figure illustrates a well site system in which various embodiments discussed herein can be employed. The well site can be onshore or offshore. In this exemplary system, a borehole 11 is formed in subsurface formations by rotary drilling in a manner that is known. Some embodiments can also use directional drilling.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, which engages the kelly 17 at the upper end of the drill string. The drill string 12 is suspended from a hook 18, attached to a traveling block through the kelly 17 and a rotary swivel 19 which permits rotation of the drill string relative to the hook. A top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a rotosteerable system and motor 150, and drill bit 105. The LWD module 120 is housed in a special type of drill collar and can contain one or more types of logging tools. More than one LWD and/or MWD module can be employed, e.g. as represented at 120A. As may be appreciated, reference herein to a module at the position of 120 can alternatively mean a module at the position of 120A, and so forth. The LWD module includes capabilities for measuring, processing, and storing information, as well as for communicating with the surface equipment. In the present embodiment, the LWD module includes a NMR measuring device.

The MWD module 130 is also housed in a special type of drill collar and can contain one or more devices for measuring characteristics of the drill string and drill bit. The MWD tool further includes an apparatus for generating electrical power to the downhole system. This may typically include a mud turbine generator powered by the flow of the drilling fluid, it being understood that other power and/or battery systems may be employed. In certain embodiments, the MWD module may include one or more of the following types of measuring devices: a weight-on-bit measuring device, a torque measuring device, a vibration measuring device, a shock measuring device, a stick/slip measuring device, a direction measuring device, and an inclination measuring device.

Figure 2:
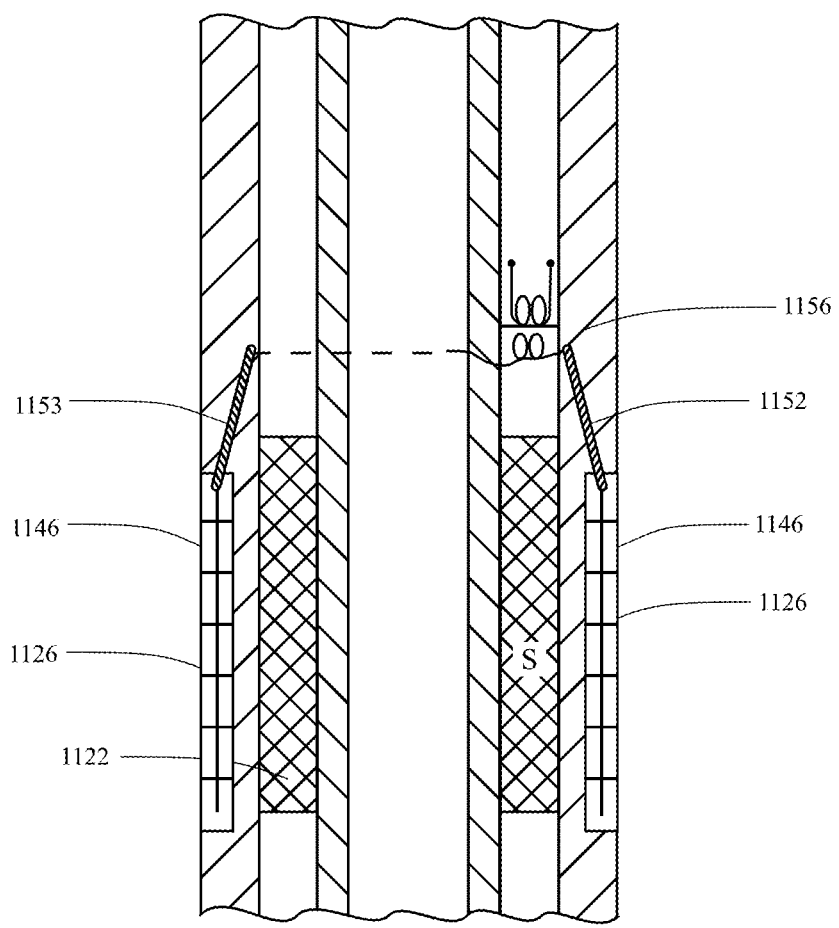
FIG. 2 shows a prior art nuclear magnetic resonance logging tool.

FIG. 2 shows an embodiment of a type of device described in U.S. Pat. No. 5,629,623 for formation evaluation while drilling using pulsed nuclear magnetic resonance (NMR), incorporated herein by reference, it being understood that other types of NMR/LWD tools can also be utilized as the LWD tool 120 or part of an LWD tool suite 120A. As described in the '623 Patent, an embodiment of one configuration of the device comprises a modified drill collar having an axial groove or slot that is filled with a ceramic insulator, and contains RF antenna 1126, which is protected by a non-magnetic cover 1146 and produces and receives pulsed RF electromagnetic energy. In the embodiment shown, the conductors of the RF antenna are grounded at one end to the drill collar. At the other end, the conductors are coupled to an RF transformer 1156 via pressure feedthroughs 1152 and 1153. A cylindrical magnet 1122 produces a static magnetic field in the formations. The RF antenna can also be arranged so that the drill collar itself produces the oscillating RF magnetic field. The oscillating RF magnetic field, which excites nuclei of substances in the formations, is axially symmetric, to facilitate measurements during rotation of the drill string.

With the preceding discussion of well site and conventional NMR tool designs in mind, aspects of image reconstruction pertinent to the present azimuthal phase encoding approach are discussed. In particular, prior to discussing inversion algorithms for azimuthal imaging, an overview of the generalized forward model employed in the present approaches is provided. As noted above, the generalized forward model is a linear transformation of formation properties such as azimuth dependent $T_2$ distribution and is a convolution of these properties with a time-dependent kernel. With this in mind, let $f(T_2, \psi)$ denote the unknown $T_2$ distribution at formation angle $\psi$, where $0 \leq \psi \leq 2\pi$. This angle is defined relative to the borehole. For example, it is zero at the upside of the borehole. The CPMG magnetization decay in the formation denoted as $M_t(\psi)$ is a Laplace transform of this unknown $T_2$ distribution:

$$M_t(\psi) = \int_0^\infty f(T_2, \psi) e^{-t/T_2} dT_2. \quad (1)$$

The measured data is a convolution of this azimuth dependent magnetization with a known kernel that is dependent on the tool geometry and which may differ for the various azimuthal phase encoding embodiments described herein, as discussed in greater detail below.

PRESENT EMBODIMENTS

The present discussion relates to performing azimuthal imaging using nuclear magnetic resonance (NMR) measurements acquired in logging-while-drilling contexts, as described above. Such approaches employ a forward model and inversion algorithm as part of the azimuthal imaging process and, as discussed herein, azimuthal measurements can be acquired using a variety of different kinds of components, including, but not limited to gradient coils, which may include azimuthal phase encoding coils. The generalized forward model is a linear transformation of formation-dependent properties, such as the azimuth-dependent $T_2$ distribution, and is a convolution of these properties with a time-dependent kernel. The inversion algorithm is based on the deconvolution of the measured data with the known kernel after expansion into a suitable basis of orthogonal functions (such as Fourier or Haar basis). Such azimuthal information may be useful for geo-steering and to obtain azimuth-dependent formation parameters, such as porosity, bound fluid volume, permeability and logarithmic mean $T_2$.

Azimuthal Phase Encoding (APEC)—

In one embodiment, referred to herein as azimuthal phase encoding (APEC), the induced gyromagnetic spins are encoded with an azimuth dependent phase, such as by use of an azimuthal phase encoding coil (i.e., an APEC coil). The azimuthal phase encoding present in the spins may be leveraged in the measured signals. In this concept, multiple measurements are made by firing coils pointing at different angles (i.e., different azimuthal positions) into the surrounding formation. The inversion algorithm is used to estimate azimuth dependent formation properties from these multiple measurements using the azimuth dependent phase encoding.

Figure 3:
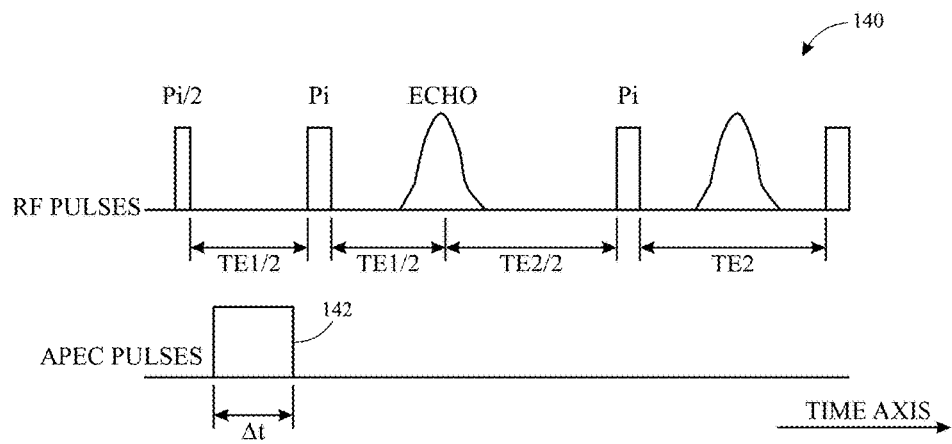
FIG. 3 depicts an example of an APEC pulse sequence, in accordance with aspects of the present disclosure.
Figure 4:
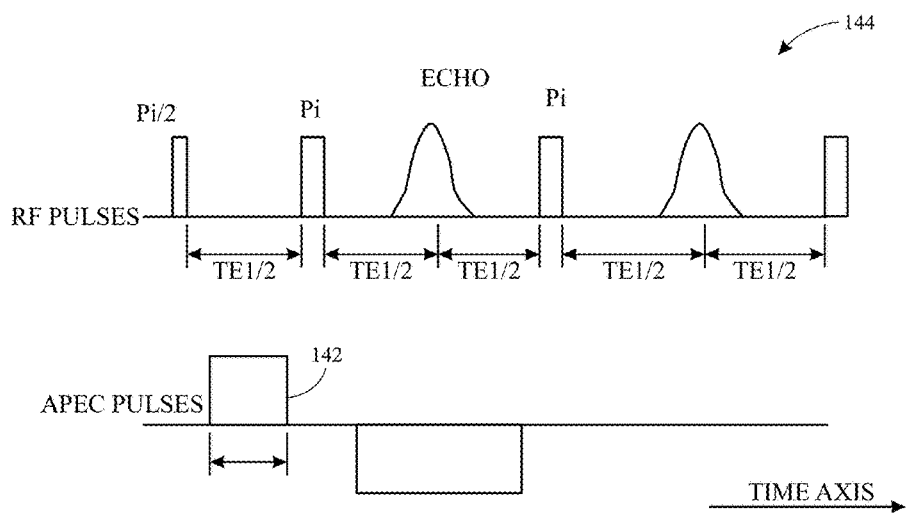
FIG. 4 depicts a further example of an APEC pulse sequence, in accordance with aspects of the present disclosure.

Examples of sample pulse sequences for an azimuthal phase encoding operation are shown in FIGS. 3 and 4. In particular, FIG. 3 depicts an example of a pulse sequence 140 with a single APEC pulse 142 in conjunction with a Carr-Purcell-Meiboom-Gill (CPMG) sequence. Conversely, FIG. 4 depicts an example of a pulse sequence 144 with a pair of offset and opposite APEC pulses 142 in conjunction with a Carr-Purcell-Meiboom-Gill (CPMG) sequence. Aspects of such APEC pulses and their use in an imaging operation are described in greater detail below.

The underlying encoding strategy in an APEC implementation takes advantage of the rotary motion of the logging-while-drilling (LWD) tool to eliminate the need to apply different pulses to the APEC coil. In particular, the pulsed field gradient leads to a phase shift in the transverse magnetization that varies spatially, and this spatial variation is useful for azimuthal imaging. In this manner, the effect of the rotational motion in varying the spatial sensitivity of the individual measurements is used without varying the encoding pulses. The transverse magnetization may be detected, in one implementation, using the Carr-Purcell-Meiboom-Gill (CPMG) pulse sequence with $180°_x$ and $180°_y$ refocusing pulses, as shown in FIGS. 3 and 4. In such an implementation it is assumed that the two measurements are acquired with identical tool orientations. Unlike conventional gradient encoding, such as in medical MRI, combining the varying APEC coil's sensitivity profile with rotary motion reduces or eliminates the need for multiple gradient pulse areas and/or reduce the necessary maximum gradient pulse value necessary for some target resolution.

Variations or Improvements on this APEC Approach—

In the version of the APEC approach described above, the phases of the refocusing 180° pulses are switched between x and y. This may be desirable in order to recover the full complex phase of the APEC encoded signal due to the CPMG train of pulses in a grossly inhomogeneous field preserving only a single component of the signal's complex signal. However, in one variation, due to the position variations between the multiple encoding instances, obtaining both components (i.e., x and y components) is not necessary for the reconstruction and this projection property can instead be incorporated into the reconstruction kernel. For the not-repetition advantage, a conventional full phase-alternating-pair (PAP), where the phase of the initial pulse is alternated in phase by 180° between acquisitions for otherwise identical conditions, would not be used. For example, in one implementation, for relatively weak field perturbations (i.e., minor changes to the signal phase), only using the 180° y refocusing pulses would allow acquisition of more signal. The residual signal from the pulse ringing would be removed, such as by subtracting the ringing collected by from a full PAP acquisition with no APEC pulse. For the coherence selection accomplished by the PAP, which removes the imperfections of the CPMG pulses from the acquired signal, the PAP could be continued for different APEC pulse applications, incorporating its resolution as a part of the APEC inversion kernel, as discussed below. By way of example, the image for one set of NMR pulse phases and a second image for the other set of NMR pulse phases may be combined to generate a coherence selected image.

In the base APEC implementation, only a single encoding pulse strength and width is employed. Alternatively, in another implementation (i.e., a mixed phase contrast (PC) encoding/phase encoding (PE) embodiment), the gradient/APEC coil pulse strength and/or width may be varied, such as by reversing the signal, increasing or decreasing its magnitude, or zeroing the pulse. These variations, when present, would imprint different magnetization profiles for different acquisitions, allowing position information to be resolved analogous to conventional phase encoding. As there is tool motion (i.e., rotational motion) a mixture of repeating the sample pulse amplitude for different orientations would work with an APEC-style reconstruction, though the Fourier conventions present in conventional MRI reconstructions on their own would not work for this sampling. This incorporation of multiple pulse strengths could further improve the APEC inversion.

With the preceding discussion in mind, and with respect to the next variation to be discussed, it should be appreciated that, in the base implementation the single encoding is relatively weak and the variation in the magnetization profile is a wave that is similar to the APEC coil's sensitivity profile. As this pulse is increased in strength, multiple waves will form as the phase difference between different positions increase. This is the source of the varied encoding profiles discussed in the preceding variation in the APEC concept. In the present variation (i.e., a resolution matched phase encoding embodiment), this effective wavelength may be matched to the desired resolution for at least some of the encoding pulses. When so matched, the overall APEC kernel properties may be improved when the natural variation of the coil is small of the length desired resolved element.

In a further embodiment, lateral phase encoding coils and/or multiple APEC coils may be employed. By way of example, multiple APEC coils, even if used only for azimuthal imaging, would allow for a greater variety of encoding profiles. Such profiles may be of the same shape but at different orientations or may be different profile types to directly encode for higher spatial-frequency components with weaker gradient pulses. By way of example, in one implementation two sets of APEC coils may be employed in which their respective encoding profiles are shifted by 90° relative to one another.

Similarly, though the APEC concept provides improved azimuthal resolution, lateral resolution (i.e., in the direction of the borehole) may also be provided or improved by adding a second or different coil with a linear field ramp (e.g., a lateral phase encoding coil (LPEC)), or other suitable profile. In such an instance, the kernel may be modified to solve for coefficients corresponding to different spatial positions instead of Fourier coefficients, as done in the APEC embodiments discussed herein), since a periodic boundary condition does not exist along the lateral tool direction.

APEC Coil Implementations—

Figure 5A:
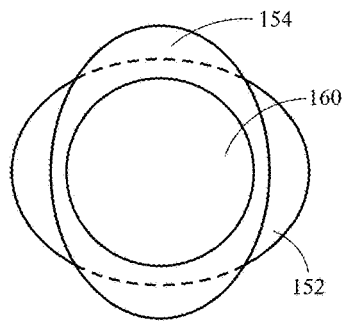
FIGS. 5A-5F depict various coil and field arrangements for generating azimuthally and/or laterally resolvable data, in accordance with aspects of the present disclosure.
Figure 5B:
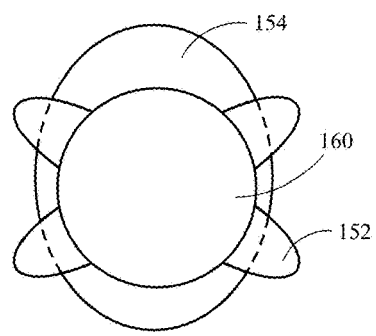

With the preceding multi-coil discussion in mind, and by way of example, FIGS. 5A-5F schematically depict various implementations of multiple azimuthal and/or lateral coils in accordance with these embodiments. For example, FIG. 5A depicts multiple APEC coils relative to a tool 160 where the differing APEC coils have different orientations (here offset 90° from one another), as shown by coil sensitivity regions 152, 154. Conversely, in FIG. 5B two APEC coils are provided in which the respective sensitivity regions or profiles 152, 154 are differently shaped.

In certain embodiments, an APEC coil with an additional azimuthal variation or a second APEC coil (as discussed above) for mainly azimuthal variation would allow a two-dimensional texture image. However, as azimuthal motion is not guaranteed, multiple gradient pulse strengths (as discussed above) may be utilized to yield azimuthal resolution. Further, there would be no degeneracy in the APEC coil strength with respect to azimuth over the sensitive region so that different azimuths could be reliably resolved. In a sense, such azimuthal encoding may be analogized to conventional MRI phase encoding, except that the inversion is coupled to the APEC inversion along the lateral dimension.

Figure 5C:
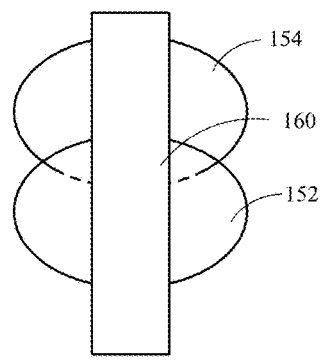
Figure 5D:
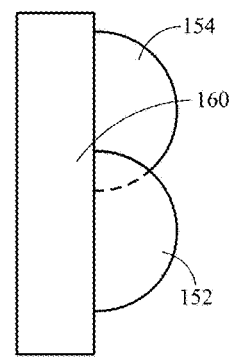
Figure 5E:
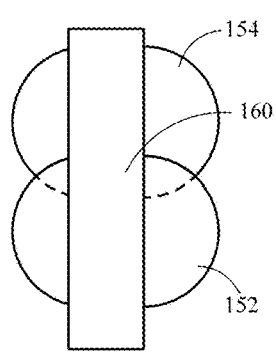
Figure 5F:
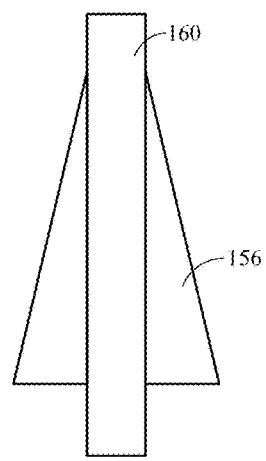

Turning to FIGS. 5C and 5D, instead of depicting multiple APEC coils, depict multiple lateral coils with respect to the tool 160. Each lateral coil has a separate sensitivity region or profile 152, 154, with FIG. 5C depicting an implementation of multiple lateral coils having sensitivity on both sides of the tool 160 and FIG. 5D instead depicting a single-sided well-logging implementation. FIG. 5E depicts an implementation in which both the azimuthal and lateral profiles are varied. FIG. 5F, unlike the preceding example, depicts a tool 160 outfitted with a linear lateral coil having a linear filed ramp profile 156.

With a laterally varying LPEC coil on a wireline logging NMR tool, the present APEC techniques may achieve lateral resolution smaller than the detecting region (i.e., the RF coil of the tool, typically 6 inches or longer) as long as the detecting region is long relative to the tool motion between measurements. The possible resolution with the APEC approach may improve upon current resolutions by incorporating deconvolution of the tool's lateral detection sensitivity profile.

In a further enhancement of the APEC concept discussed herein, full two-dimensional (2D) or three-dimensional (3D) image reconstruction may be accomplished, with the third-dimension corresponding to the radial depth or penetration into the surrounding formation (in contrast to the lateral dimension which, herein, corresponds to the borehole direction or dimension).

With respect to this concept, it should be appreciated that, for logging-while-drilling (LWD) APEC imaging, the APEC inversion is for the azimuthal dimension and data is binned for different borehole (i.e., lateral) positions. In this sense the APEC approach already generates a multidimensional image in that each image is for a defined lateral position and contains azimuthal image data, i.e., each image may be defined by the lateral position and azimuth. Similarly, multiple slices at different NMR resonance frequencies in a gradient would add a depth dimension (i.e., radial depth) for a 3D view, where the APEC inversion would be applied separately to each slice. In both of these examples, the APEC algorithm only inverts along one of the imaging dimensions.

Conversely, by incorporating knowledge of the APEC coil profile and of the tool motion along multiple dimensions (i.e., rotational and linearly along the borehole), the APEC inversion process could be applied to yield a full 2D or 3D reconstruction. In the case of a 2D LWD image reconstruction the lateral and azimuthal profile of the APEC coil with the known depth and angle of the tool at a given time would give the kernel relating these measurements to the elements in an image of azimuth and lateral position.

For example, for two azimuthal measurements for which the tool 160 has moved a distance d between measurements, the data measure different parts of the formation. The difference between the two data measurements is directly related to the signal from the edges of the detector. Systematic consideration of this difference in the inversion kernel allows imaging along the lateral dimension. Combination of this information with the APEC approach allows for a 2D APEC inversion. Analogous to the 2D implementation, a 3D APEC inversion may be achieved by knowing the 3D-APEC coil profile and three-dimensional position of the instrument. Such an approach may utilize a combination of motion along three-dimensions and multiple APEC coils with different profiles, as discussed in the preceding APEC variation.

With continuous lateral motion (i.e., motion in the direction of the borehole), as occurs during logging-while-drilling, and where 2D APEC inversion, the detection coil sensitivity, not just the APEC coil sensitivity of the tool 160, changes over time. The detection coil's sensitivity allows for only a window (as opposed to continuous) of visible formation. As with the multiple-coil concept discussed below, the NMR detection profile varies over time and its incorporation into the APEC kernel may add further resolution. The limited lateral detection region also defines a limited lateral field of view for any given block of acquisitions. With this in mind, a large dataset can be broken down into parts (such as based upon lateral field of view detection regions) and these parts inverted separately at high resolution, without inverting the entire dataset at once.

Forward Model and Kernel—APEC Concepts:

For certain of these embodiments (e.g., APEC employed in a logging-while-drilling context), the measurement is described by the forward model:

$$M_t(\theta_j) = \int_0^{2\pi} M_t(\psi) k(\theta_j - \psi) d\psi. \qquad (2)$$

In APEC implementations, the left-hand side of equation (2) denotes the measured data at time t when the coil points to angle $\theta_j$ when it is energized (i.e., fired). This angle, $\theta_j$, is defined relative to the borehole, such as from the upside of the borehole. For example, if the coil orientation is pointed toward the upside of the borehole, then $\theta_j$ is determined to be zero.

In APEC embodiments, once a coil is fired at angle $\theta_j$, this angle remains the same for an entire CPMG train of echoes and does not vary with time during one CPMG measurement. This is because the firing of the APEC coil(s) happens only at the beginning of the pulse sequences, as described with reference to FIGS. 3 and 4 and in the related discussion.

With reference to the forward model, the angle $\theta_j$ is measured at the time of the APEC firing and this angle is associated with the data set being acquired. Measurement of the angle (also referred to as the "toolface") can be done by a combination of the measurement of the gravity and the Earth magnetic field. For example, during horizontal drilling, gravity points downward and provides a good reference frame for tool orientation. For vertical wells, Earth magnetic field could provide the direction of magnetic north which could be used as a direction across the borehole and thus a toolface measurement. For a drilling toolstring, such measurement is often performed near the drill and it could be sufficient if the LWD NMR tool is not tool far behind. Or, such a 6-axes system (magnetometer and gravity meter) could be house closer to the NMR tool provided the effort of the tool magnet can be corrected for the magnetometer.

A number of CPMG measurements are acquired corresponding to different firing angles (i.e., j=1, . . . $N_c$) to generate data corresponding to the different angles. For imaging purposes, in one implementation it may be assumed that all of the measurements (i.e., j=1, . . . $N_c$) are made at one depth, and therefore correspond to one scan in the formation image at that depth. As will be appreciated, the more directions (i.e., firing angles) that can be covered in a scan at a given depth, the better the quality of the inverted image corresponding to that scan.

Figure 6:
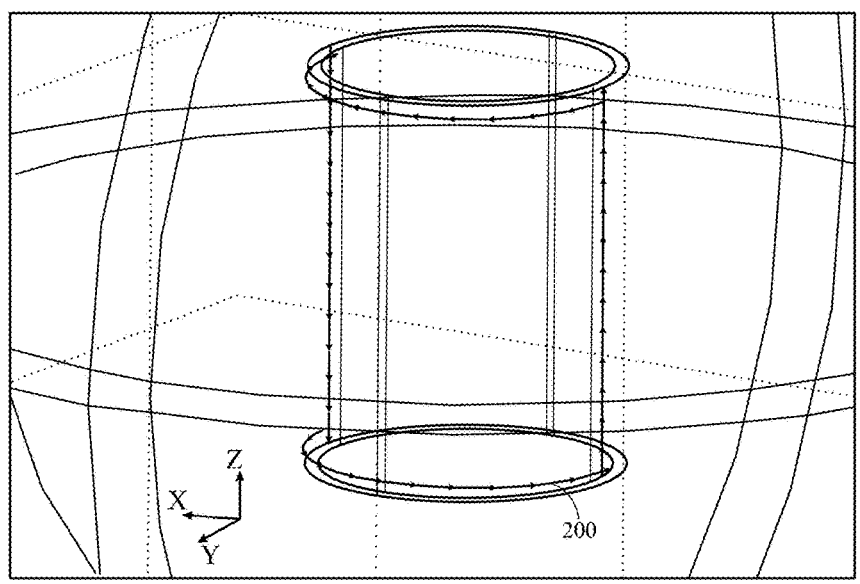
FIG. 6 depicts a coil suitable for generating azimuth-dependent phase encoded spins, in accordance with aspects of the present disclosure.
Figure 7:
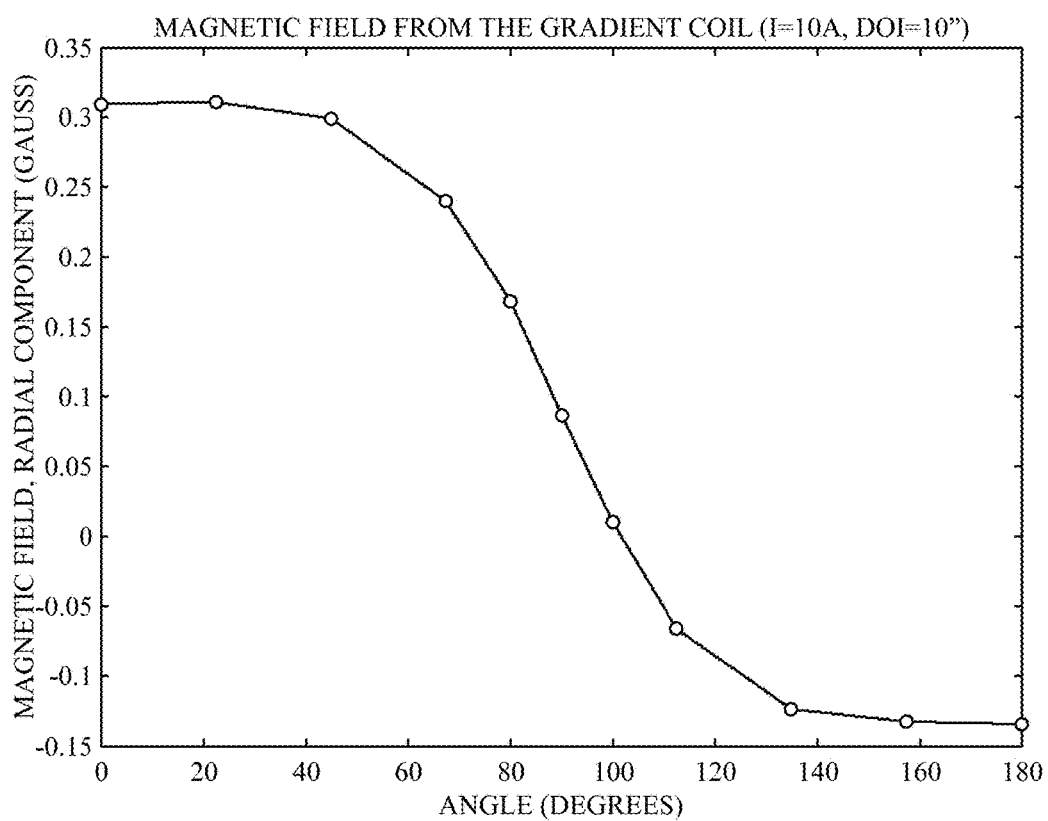
FIG. 7 depicts a magnetic field corresponding to an azimuth phase encoding coil as discussed herein and in accordance with aspects of the present disclosure.

With respect to the different time-dependent kernels of the azimuthal imaging embodiments discussed herein, the time-dependent kernel for the APEC concept is given by:

$$k(\theta_j - \psi) = e^{-i\gamma \Delta t B(\theta_j - \psi) A_j} \qquad (3)$$

where $A_j$ refers to the current fired through the coil, $\gamma$ is the gyromagnetic ratio of the nuclei, $\gamma$ and $\Delta t$ are constants, $B(\theta_j - \psi)$ is the known strength of the APEC coil B field along the direction of the static magnetic field (e.g., a known B field per 1 ampere of current), and $\Delta t$ is the duration of the APEC encoding pulse. An illustration of this concept, along with the associated field are shown in FIGS. 6 and 7, where FIG. 6 illustrates a coil 200 (e.g., a saddle coil) giving rise to azimuth-dependent phase-encoded spins and where FIG. 7 depicts the magnetic field from the coil 200 of FIG. 6, which can be measured experimentally and used in the construction of the kernel given by equation (3). This magnetic field (the component along the $B_0$ field) can be approximated by the functional form:

$$B(\theta_j - \psi) \propto \cos(\theta_j - \psi). \tag{4}$$

As may be appreciated from this discussion, the APEC kernel can be changed dynamically by changing the gradients (i.e., varying the strength of the pulse if changing the kernel).

Inversion Algorithm—General

As noted above, the inversion algorithm is based on the deconvolution of the measured data with the known kernel once the data has been expanded into a suitable basis of orthogonal functions. The inversion algorithm computes the azimuth dependent $T_2$ distribution $f(T_2, \psi)$ from the measured data $M_t(\theta_j(t))$, $j=1, \ldots, N_c$. The inversion can be performed in two steps. First, the azimuth-dependent magnetization $M_t(\psi)$ is computed. Next, from the estimate of $M_t(\psi)$, an inverse Laplace-like algorithm is employed to estimate $f(T_2, \psi)$.

a) Estimate of Azimuth-Dependent Magnetization—

At any instant of time t, the azimuth dependent magnetization is periodic with period $2\pi$. Therefore, it can be expressed in terms of the Fourier basis:

$$M_t(\psi) = \frac{a_{0,t}}{\sqrt{2\pi}} + \frac{1}{\sqrt{\pi}} \sum_{n=1}^{\infty} a_{n,t} \cos(n\psi) + b_{n,t} \sin(n\psi) \tag{5}$$

where the Fourier coefficients $a_{0,t}$, $a_{n,t}$, and $b_{n,t}$ are given by:

$$a_{0,t} = \frac{1}{\sqrt{2\pi}} \int_0^{2\pi} M_t(\psi) d\psi \tag{6}$$

$$a_{n,t} = \frac{1}{\sqrt{\pi}} \int_0^{2\pi} M_t(\psi) \cos(n\psi) d\psi \tag{7}$$

$$b_{n,t} = \frac{1}{\sqrt{\pi}} \int_0^{2\pi} M_t(\psi) \sin(n\psi) d\psi. \tag{8}$$

In this example, the Fourier expression of the kernel may be represented as:

$$\kappa(\psi) = \frac{x_0}{\sqrt{2\pi}} + \frac{1}{\sqrt{\pi}} \sum_{n=1}^{\infty} \cos(n\psi) + y_n \sin(n\psi) \tag{9}$$

where the Fourier coefficients $x_0$ and $x_n$, $y_n$ can be computed from the known kernel:

$$x_0 = \frac{1}{\sqrt{2\pi}} \int_0^{2\pi} \kappa(\psi) d\psi \tag{10}$$

$$x_n = \frac{1}{\sqrt{\pi}} \int_0^{2\pi} \kappa(\psi) \cos(n\psi) d\psi \tag{11}$$

$$y_n = \frac{1}{\sqrt{\pi}} \int_0^{2\pi} \kappa(\psi) \sin(n\psi) d\psi. \tag{12}$$

In the case of the APEC concepts discussed herein, these Fourier coefficients are not dependent on time t.

At any time t equation (2) (i.e., the respective forward models for the APEC concept) can be rewritten as:

$$M_t(\theta_j) = a_{0,t} x_0 + \Sigma_{n=1}^{\infty} a_{n,t} [\cos(n\theta_j) x_n + \sin(n\theta_j) y_n] + b_{n,t} [\sin(n\theta_j) x_n - \cos(n\theta_j) y_n], j=1, \ldots, N_c. \tag{13}$$

When the kernel is symmetric, $y_n = 0$. In these cases, the coefficients $a_{0,t}$, $a_{n,t}$, $b_{n,t}$, $n=1, \ldots N_F$ can be solved by a linear system of equations:

$$\begin{bmatrix} M_t(\theta_1) \\ M_t(\theta_2) \\ \vdots \\ M_t(\theta_{N_c}) \end{bmatrix} = \tag{14}$$

$$\begin{bmatrix} x_0 & x_1\cos(\theta_1) & x_1\sin(\theta_1) & \ldots & x_{N_F}\cos(N_F\theta_1) & x_{N_F}\sin(N_F\theta_1) \\ x_0 & x_1\cos(\theta_2) & x_1\sin(\theta_2) & \ldots & x_{N_F}\cos(N_F\theta_2) & x_{N_F}\sin(N_F\theta_2) \\ & & & \vdots & & \\ x_0 & x_1\cos(\theta_{N_c}) & x_1\sin(\theta_{N_c}) & \ldots & x_{N_F}\cos(N_F\theta_{N_c}) & x_{N_F}\sin(N_F\theta_{N_c}) \end{bmatrix}$$

$$\begin{bmatrix} a_{0,t} \\ a_{1,t} \\ b_{1,t} \\ \vdots \\ a_{N_F,t} \\ b_{N_F,t} \end{bmatrix}$$

where $N_F$ refers to the number of Fourier coefficients. From these estimated coefficients, the estimated magnetization at any time t at azimuth $\psi$ is:

$$\tilde{M}_t(\psi) \approx \frac{a_{0,t}}{\sqrt{2\pi}} + \frac{1}{\sqrt{\pi}} \sum_{n=1}^{N_F} a_{n,t} \cos(n\psi) + b_{n,t} \sin(n\psi), \tag{15}$$

$$\psi = 0, \ldots, 2\pi.$$

b) Estimate of Azimuth-Dependent $T_2$ Distribution—

From the magnetization data $\tilde{M}(t)(\psi)$, the azimuth-dependent $T_2$ distribution can be estimated. For example, in one implementation, the reconstructed magnetization data in a quadrant can be averaged and the $T_2$ distribution can be estimated using an inverse-Laplace like transform.

With the preceding discussion and comments regarding the forward model and inversion algorithm in mind, the following examples and simulations provide additional insight into the present concepts.

First Example: Simulated Data from an Azimuthally Symmetric Formation

In this example, a formation where the $T_2$ relaxation is azimuthally symmetric with a relaxation time of 0.1 seconds is assumed.

APEC Example—

Based on this assumed azimuthally symmetric formation, the APEC kernel was used for data acquisition and analysis. As noted above, the APEC kernel is utilized in an implementation in which gradient coil is activated (i.e., "fired") at varying tool orientations between pairs of measurements, each corresponding to a PAP. In the context of the present example, this leads to seven measurements being acquired using the APEC concept in the time taken for the hole-burning kernel to make fourteen measurements.

Figure 8A:
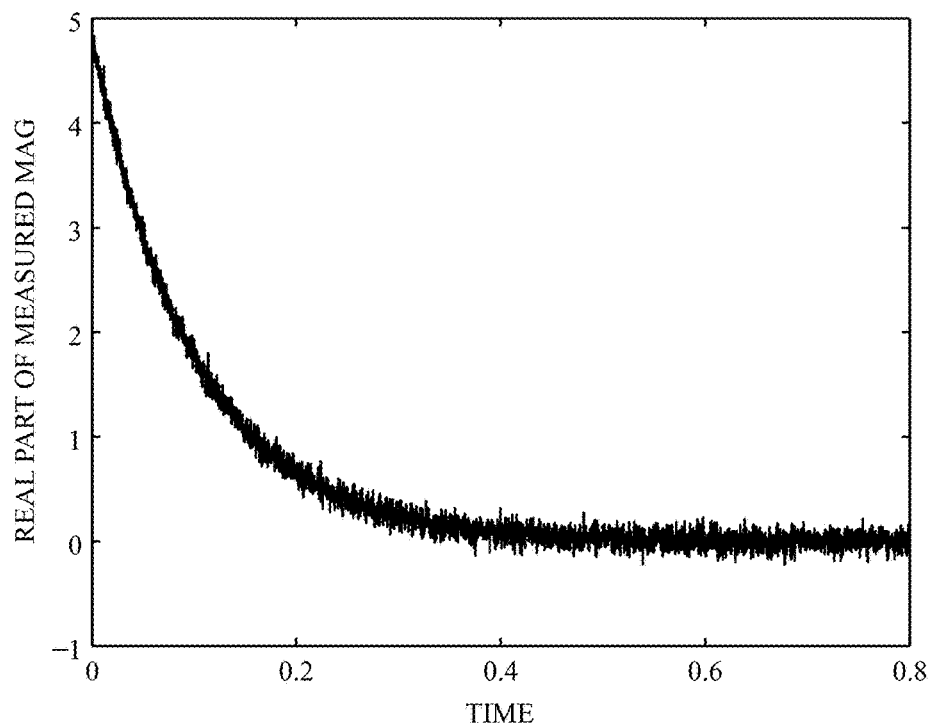
FIG. 8A-8D depict simulated measurement and processed data for an azimuthally symmetric formation processed in accordance with a second approach as discussed herein.

Turning to the figures, FIG. 8A depicts the data at one of these seven angles with measurement noise, where the noise standard deviation is $$\sigma_\epsilon = \frac{0.1}{\sqrt{2}}.$$

Figure 8B:
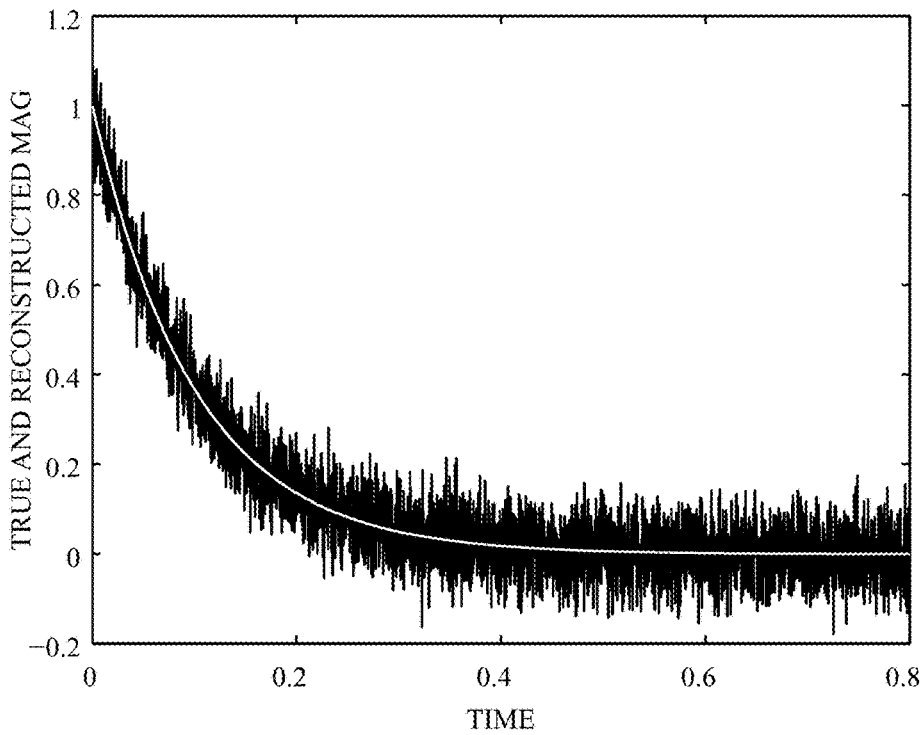
Figure 8C:
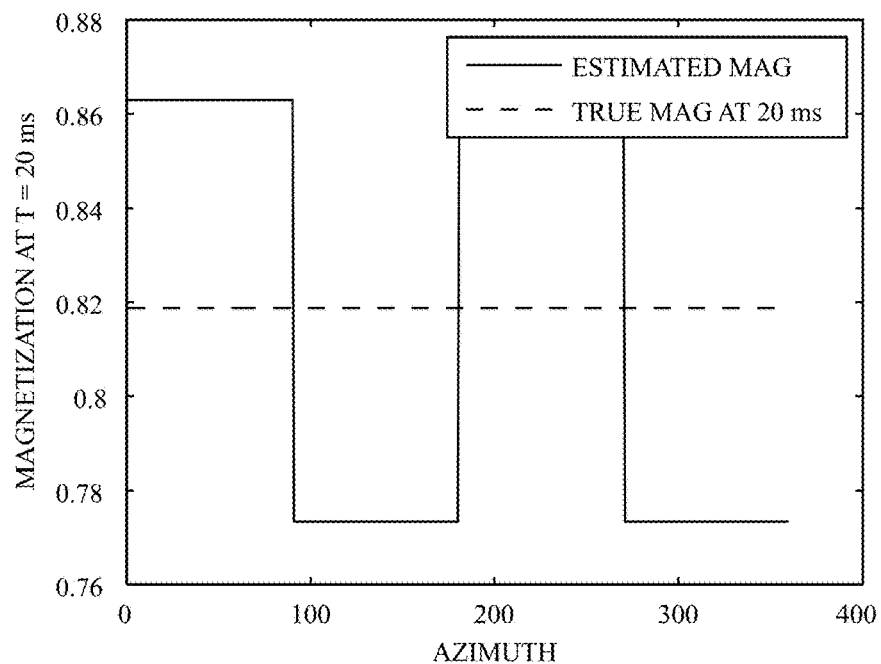
Figure 8D:
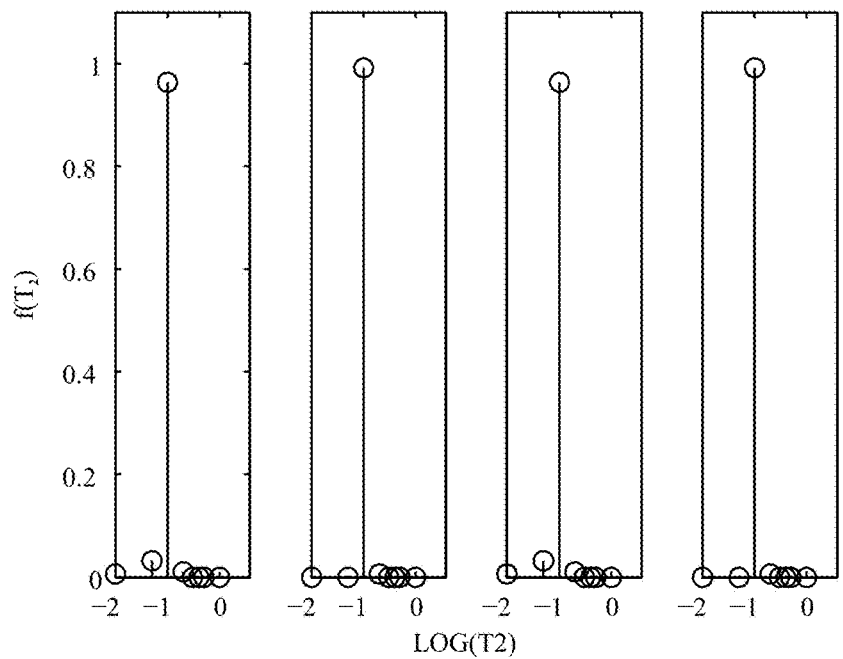

The reconstructed data $\tilde{M}_t$ at $\psi=0°$ is obtained using the inversion algorithm described above and is shown in FIG. 8B, along with an overlay of the true magnetization, which illustrates that the reconstructed data matches the true decay well. The true magnetization and the Fourier reconstruction from equation (15) at time $t=200$ μs as a function of azimuth is shown in FIG. 8C. The reconstructed $T_2$ distribution in each quadrant obtained from $\tilde{M}(\psi)$ is shown in FIG. 8D. The estimated $T_2$ distribution is very close to the true $T_2$ distribution of the model data, with a relaxation time of 0.1 seconds in all quadrants.

Second Example: Simulated Data from an Azimuthally Asymmetric Formation

In the example, a formation is simulated that is azimuthally different in one quadrant, i.e., asymmetric. In particular, in this example, a formation is assumed in which the $T_2$ relaxation time is azimuthally asymmetric, with a relaxation time of 0.1 seconds in three quadrants and 3 seconds in the fourth quadrant. The number of angles fired as well as the noise standard deviation are similar to the previous, azimuthally symmetric, example (i.e., seven angles for the APEC concept). As discussed below, the azimuthal asymmetry in this example is evident in certain of the figures (e.g., FIGS. 9B, and 9D). This asymmetry, as shown in these examples, leads to a longer relaxation time, with a $T_2$ of seconds in the "fourth" quadrant.

APEC Example—

Turning to FIGS. 9A-9D, Based on this azimuthally asymmetric formation, the APEC kernel was used for data acquisition and analysis. As noted above, in the context of the present example, the use of the APEC kernel leads to seven measurements being acquired due to the gradient coil being activated at identical tool orientations.

Figure 9A:
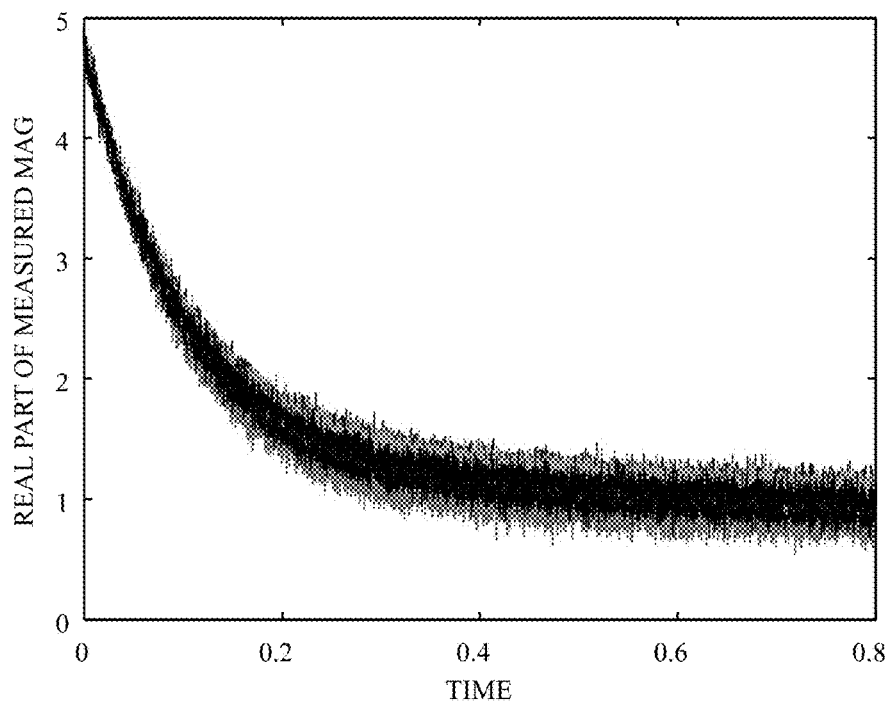
FIGS. 9A-9D depict simulated measurement and processed data for an azimuthally asymmetric formation processed in accordance with a second approach as discussed herein.

Turning to the figures, FIG. 9A depicts the data measured at the seven angles with measurement noise (i.e., additive noise), where the noise standard deviation is $$\sigma_\epsilon = \frac{0.1}{\sqrt{2}}.$$

Figure 9B:
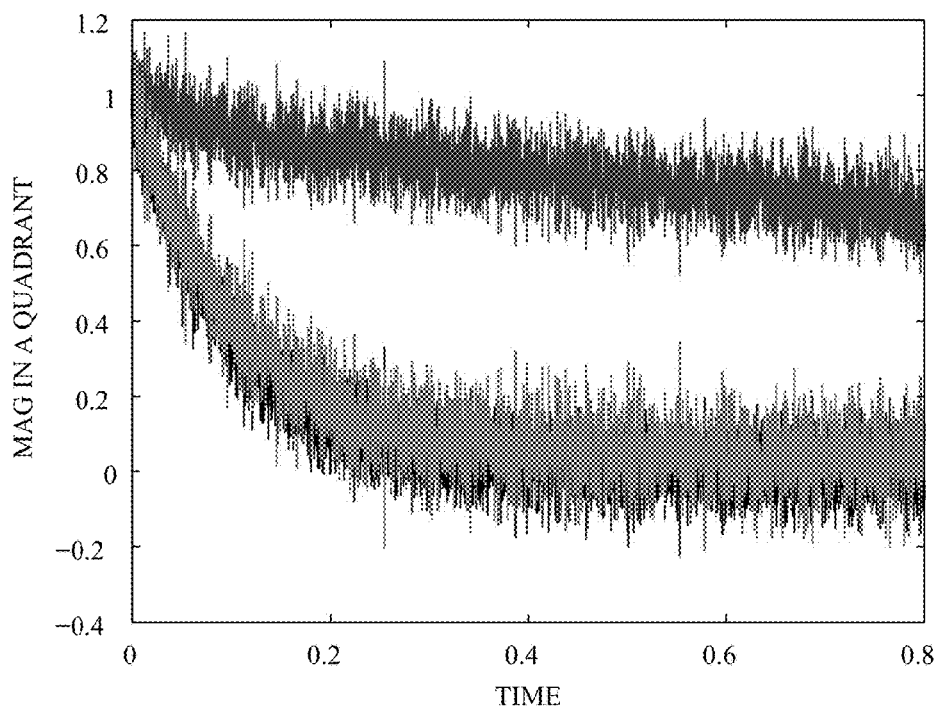
Figure 9C:
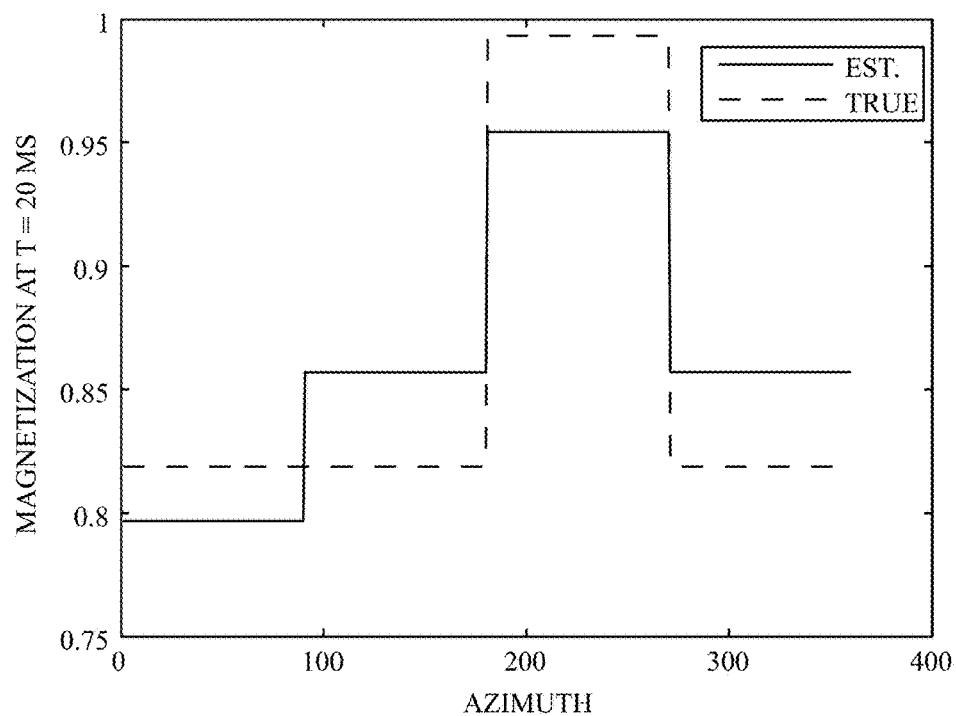
Figure 9D:
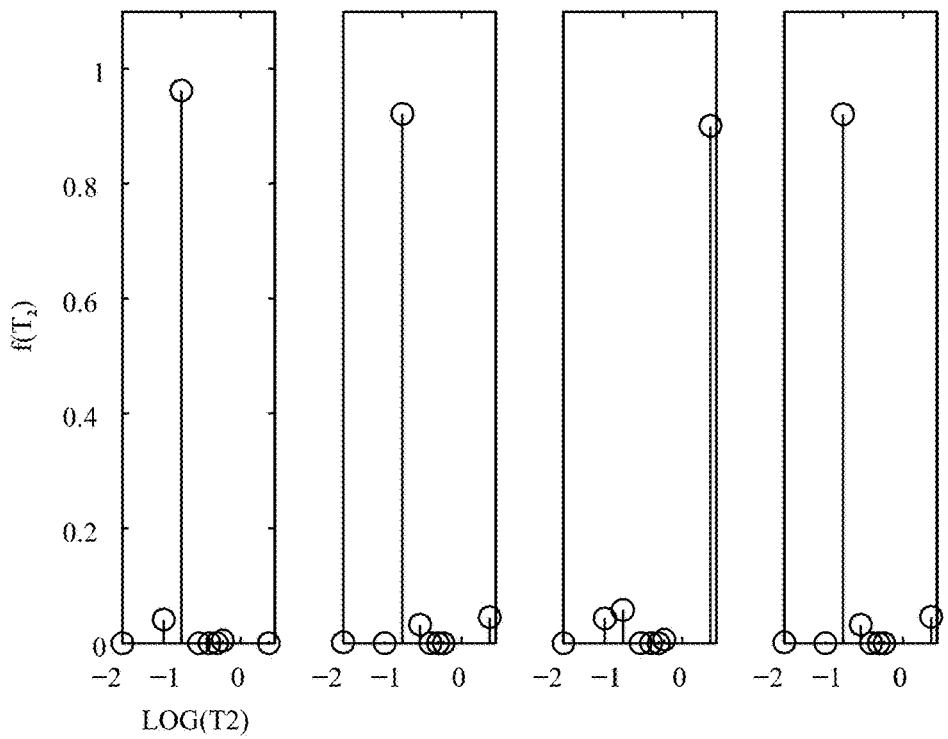

In FIG. 9B, the estimated $\tilde{M}_t(\psi)$ is shown for the four quadrants. The quadrant having the greater relaxation time is clearly discernible as the higher band. Turning to FIG. 9C, the true magnetization and the Fourier reconstruction from equation (15) at time $t=200$ μs as a function of azimuth is shown. The reconstructed $T_2$ distribution in each quadrant obtained from $\tilde{M}(\psi)$ is shown in FIG. 9D. The estimated $T_2$ distribution is close to the true $T_2$ distribution with a relaxation time of 0.1 seconds in three quadrants and of 3 seconds in the fourth quadrant, as can be seen in FIG. 9D.

Third Example: Azimuthally Asymmetric Formation with a Gaussian $T_2$ Distribution in Each Quadrant In the example, a formation is simulated where the $T_2$ distribution is Gaussian in each quadrant.

APEC Example—

Turning to FIGS. 10A-10D, based on this asymmetric formation with Gaussian $T_2$ distributions, the APEC kernel was used for data acquisition and analysis. As noted above, in the context of the present example, the use of the APEC kernel leads to seven measurements being acquired due to the gradient coil being activated at identical tool orientations.

Figure 10A:
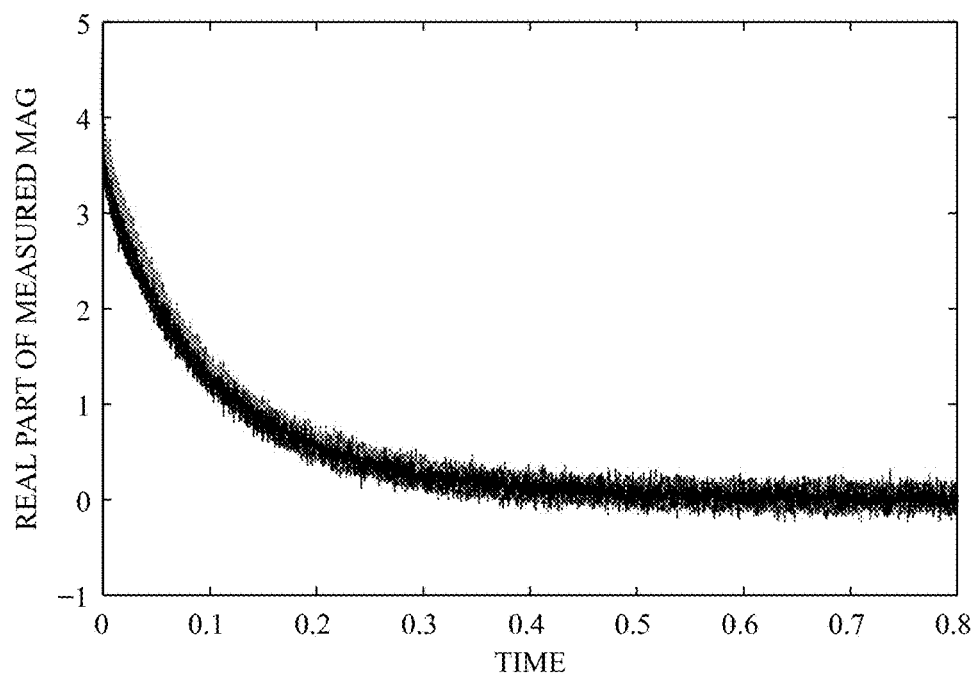
FIGS. 10A-10D depict simulated measurement and processed data for a formation with a Gaussian $T_2$ distribution that varies with azimuth processed in accordance with a second approach as discussed herein.
Figure 10B:
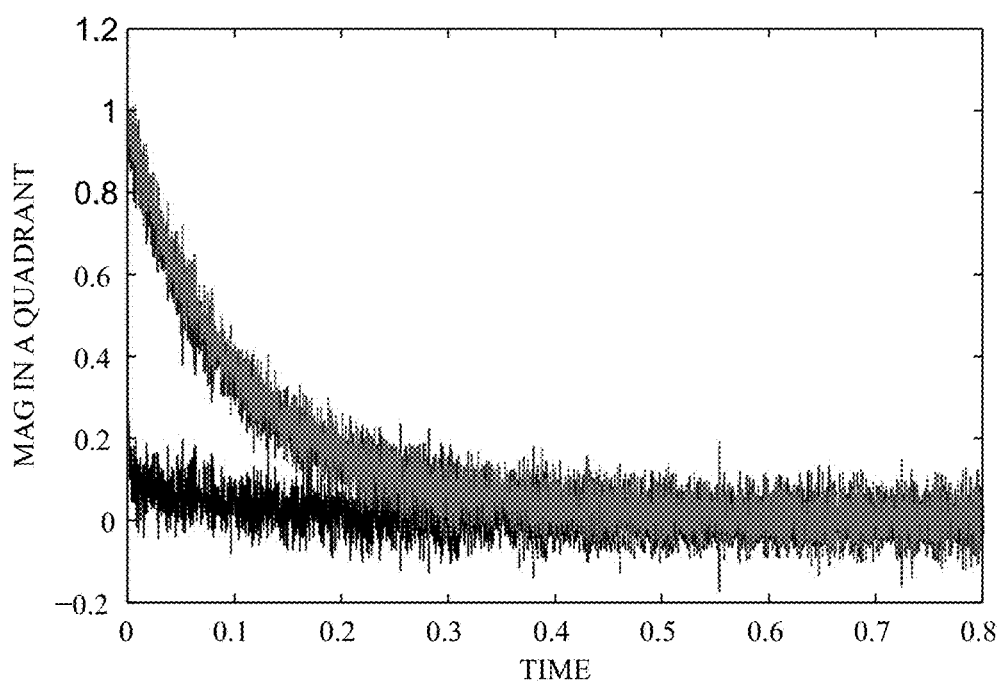

An example of the measured magnetization decay at these seven angles with additive noise ($\sigma_\epsilon=0.7$) is shown in FIG. 10A. In FIG. 10B, the reconstructed magnetization decay is shown for the four quadrants.

Figure 10C:
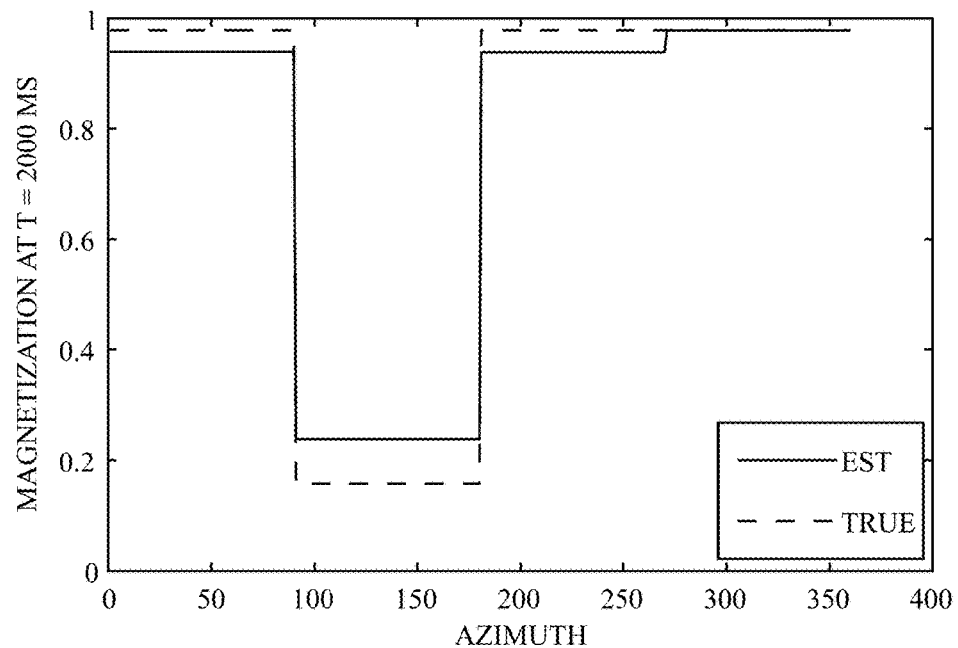
Figure 10D:
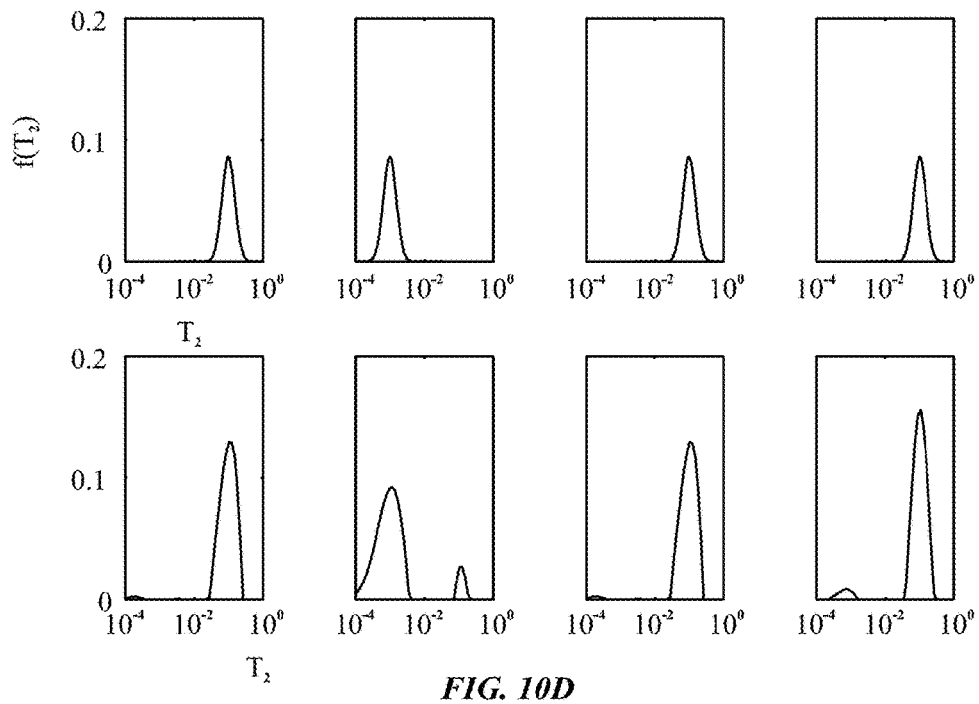

Turning to FIG. 10C, the true magnetization and the Fourier reconstruction from equation (15) at time $t=200$ μs as a function of azimuth is shown. That is, FIG. 10C depicts the estimate of the azimuthal variation in magnetization at a particular time instant averaged over each quadrant. FIG. 10D depicts the true and underlying estimated $T_2$ distributions are shown and appear to be in good agreement, which are shown to be in good agreement with the reconstructed values.

Fourth Example: Depth and Azimuthally Varying Porosity

Figure 11C:
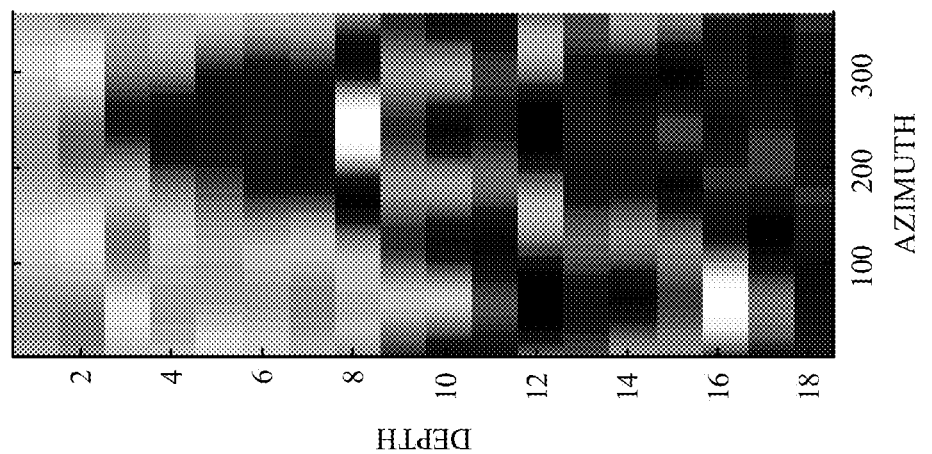
FIGS. 11A-11C depict simulated data for a formation varying azimuthally and laterally and a tool undergoing rotational and vertical motion, in accordance with aspects of the present disclosure.
Figure 11B:
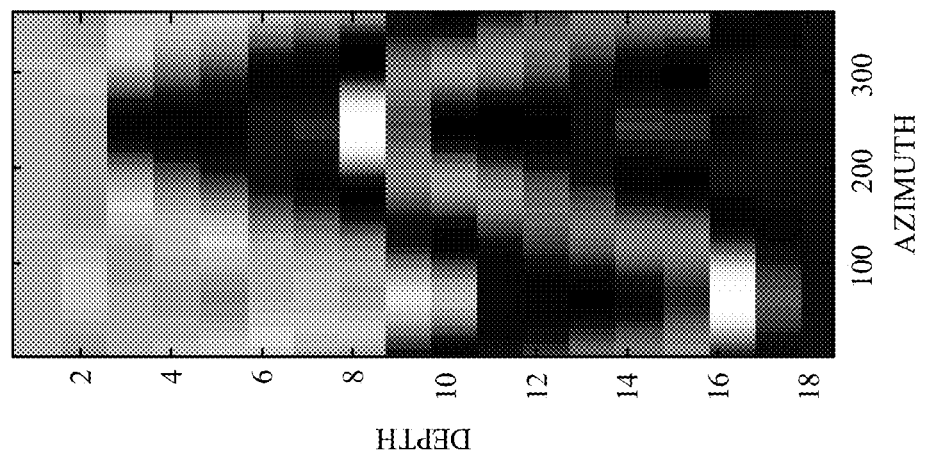
Figure 11A:
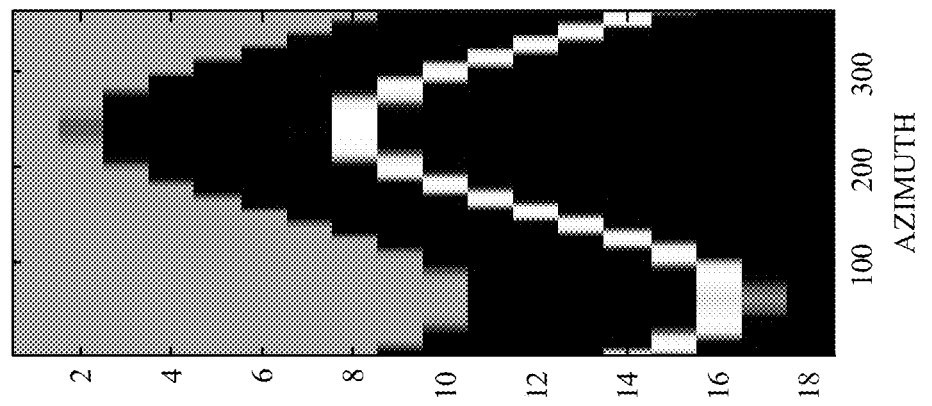

In this example, data with additive noise were simulated for the formation shown in FIG. 11A.

APEC Examples—

With respect to the APEC kernel, data was acquired at seven angles, as in the preceding examples, at each depth. Two different scenarios were simulated: a first scenario with $$\sigma_\epsilon = \frac{1}{\sqrt{2}}$$

and a second with $$\sigma_\epsilon = \frac{3}{\sqrt{2}}.$$

The reconstructed formation properties for these two scenarios are shown in FIGS. 11B and 11C respectively.

Figure 12:
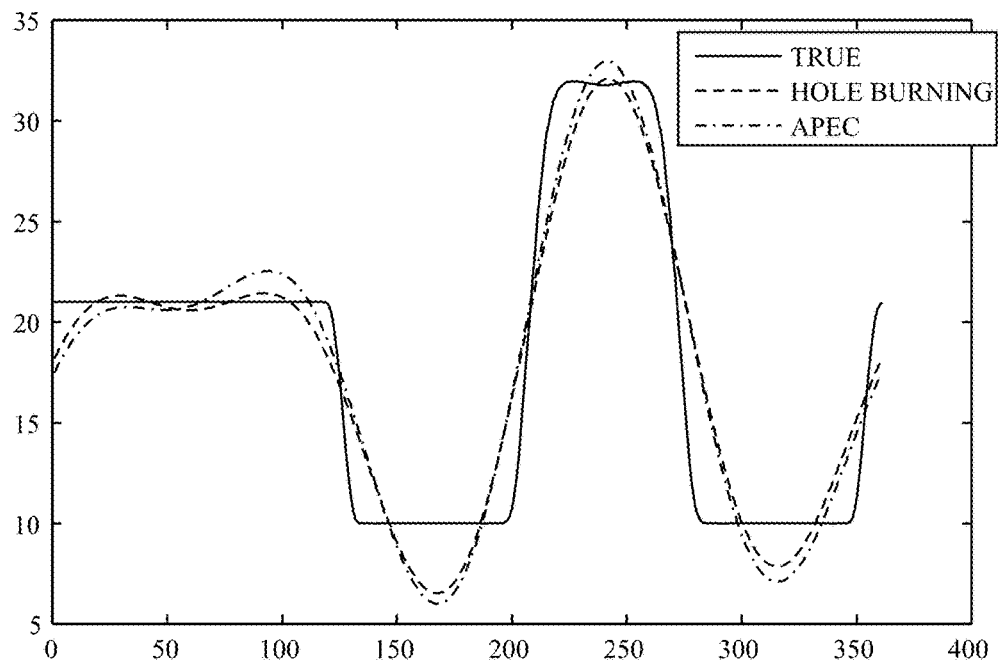
FIG. 12 depicts reconstructed porosity for simulated data, in accordance with aspects of the present disclosure.

For the APEC kernel, it can be seen that the analysis does a suitable job of reconstructing the main features of the image (i.e., a sinusoidal wave in this instance). As might be expected, there is greater image degradation when data at the lower signal-to-noise ratio was analyzed. Turning to FIG. 12, this figure depicts the Fourier reconstructed porosity at a depth of nine feet. The reconstructed porosity from both kernels does a suitable job of approximating the true porosity.

In view of the preceding discussion, a generalized forward model is described suitable for modeling azimuthal imaging magnetization decay. This generalized forward model can be used with a variety of different kernels and techniques, such as APEC concept discussed herein. In addition, an inversion algorithm is described herein that is suitable for estimating azimuthally-dependent $T_2$ distributions from the acquired data. With respect to this inversion algorithm, the azimuthal magnetization at any time t is represented in terms of its Fourier expansion. Alternatively, other orthonormal basis sets, such as the Haar expansion, may instead be employed.

Sample Coil Configurations

While the preceding discussion relates various examples of the methodology and implementation of the present approaches, various hardware and coil aspects that may be relevant to one or more of these approaches are now discussed.

Logging-While-Drilling (LWD) APEC Coils—

Figure 13A:
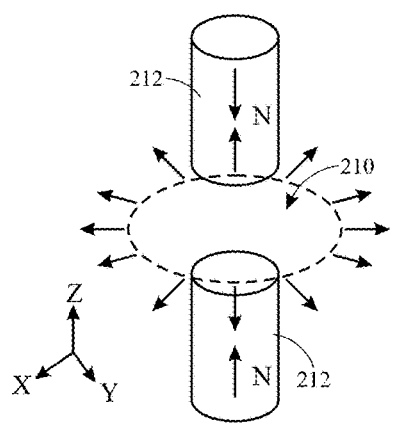

In one implementation, for APEC coils suitable for an LWD application, a Jasper-Jackson like configuration is assumed for the main static field $B_0$, as shown by reference number 210 in FIG. 13A. As depicted in FIG. 13A, the main static magnetic field 210 (i.e., $B_0$) is in the direction pointing away from the center of the magnet 212. The APEC field profile, in this depicted example, is collinear with $B_0$ on the right, antiparallel with $B_0$ on the left, and perpendicular to $B_0$ on the top and bottom.

Figure 13B:
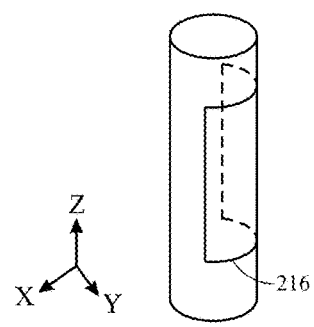

Two or more surface loops may be used to locally increase the field strength near each coil and decrease it as one moves away azimuthally from the loop. More separate loops would increase the number of oscillations, which may provide higher resolution differentiation without stronger gradient pulses. A single APEC loop would yield the simplest profile of a single period, with a minimum at one end and a maximum at the other (see single loop coil 216 in FIG. 13B and associated field 218 in FIG. 13C). A single loop making an approximately square tooth pattern would yield currents corresponding to switching direction, similarly generating alternations of regions of enhanced and diminished field strength. To minimize lateral variations in the encoding field, the width of the loops may be determined at least in part based on the length of the tool. Conversely, a two-turn coil arrangement is shown in FIG. 13D.

Wireline Lateral Phase Encoding Coil (LPEC) Systems—

In implementations using LPEC coils (as discussed above) in a wireline application, where only lateral motion of the tool is provided, the main magnetic field can be oriented either parallel or perpendicular to the tools surface.

In applications where the main field is perpendicular, a single loop or multiple loops spaced laterally (i.e., along the direction of the borehole) along the tool, analogous to the proposed LWD APEC design, would yield suitable field variations as each loop would locally increase the field and would reduce the field further away. Increasing the number of loops, as with the APEC examples, will increase the number of oscillations, with the corresponding advantages and disadvantages. As will be appreciated, the tool's lateral motion and dimension lacks the periodicity experienced in the azimuthal imaging context. Therefore the absolute (i.e., non-relative) positioning of the coil is relevant to the imaging process. For a single loop design, whether the loop is at the top or bottom would raise the field at the top and lower the field at the bottom or vice versa. A centered coil raises the field at the middle, dropping it at the edges. A variation incorporating multiple loops might involve alternating the direction of the loops, thereby halving the number of switches in the encoding field and approximately doubling its strength.

An example of this is shown in FIG. 14, where $B_0$ 210 is pointed from the tool surface. Multiple coils 230 are mounted on the surface of the tool 160 to produce lateral magnetic field gradients 232. In the depicted example, the topmost coils 230 are coils which produce field parallel to $B_0$, hence the additive effect with $B_0$, while the bottommost coils 230 produce field anti-parallel to $B_0$, hence the subtractive effect relative to $B_0$. In the depicted example, the number of "bars" representing the coils 230 correspond to the relative number of LPEC coils, with more coils producing more field.

In applications aiming to gain resolution along the well depth with LPEC, where the main field is parallel with an azimuthal orientation to the main surface, a variety of configurations can be employed. By way of example, "figure-8" surface coils may be employed, where the coils are positioned laterally, as with the single surface loop designs but with the "figure-8" configuration oriented laterally. These may be employed similarly such that the figure-8 configuration serves to change the orientation of the applied magnetic field.

In a further example, a slash or X-coil design may be employed, which would consist of a single or pair of elongated loops spanning the length of the sensitive volume of the tool. For the single loop, or slash, the loop is narrow azimuthally and slowly wraps around the tool as it goes up the tool length spanning from one side to the other of the sensitive region azimuthally. That is, if the tool surface were unwrapped, the single coil would form a diagonal or "slash" along the unwrapped surface. The component of the field produced by such a coil along the direction of the main field $B_0$ would at one end add to the main field and at the other end subtract from the main field, thereby imposing a lateral gradient (potentially a uniform gradient) on the main field.

The X-coil embodiment is similar in concept to the slash configuration, however with a second loop of the opposite orientation to the first so that the coils form an "X" centered about the tool's sensitive region. That is, if the tool surface were unwrapped, the two coils would form an "X" along the unwrapped surface. Mirroring the coil would both double the field strength and reduce the ineffective component of the field orthogonal to the applied field.

In applications where the main field is parallel with a lateral orientation to the main surface, a variety of configurations can be employed. By way of example, in one implementation loop surface coils may be employed. In one such embodiment, the same surface coil arrangement (see FIG. 14) mentioned in the context of a perpendicular main field would also work for an orientation parallel to the main field. However, in such an implementation, the effective component of the of the loop's field is the parallel to the tool's face, as opposed to perpendicular, leaving the field directly above the loop substantially unaltered and either increasing the field above it while decreasing the field below or vice versa. Thus, the centered loop design would yield a ramp with lateral distance that decreases down to zero past a certain point. Alternating the direction of adjacent loops could be used to give a sawtooth-like LPEC coil profile.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims.

What is claimed is:

1. A method of investigating an earth formation, comprising:
rotating a nuclear magnetic resonance (NMR) tool in a borehole penetrating the earth formation, the NMR tool having a permanent magnet that generates a static, main magnetic field B0 that in turn generates a magnetization in a borehole fluid aligned along B0, a transmitter antenna configured to generate a radio frequency transverse magnetization in the fluid, and one or more azimuthal phase encoding (APEC) coils configured to generate a spatially varying phase shift in the transverse magnetization, the spatially varying phase shift being substantially azimuthally sinusoidal about a circumference of the NMR tool;
applying modulated DC pulses to the one or more APEC coils to generate a pulsed field gradient that in turn generates the spatially varying phase shift in the transverse magnetization and encodes spins with an azimuth-dependent sensitivity about the circumference of the NMR tool;
causing the transmitter antenna to measure echoes generated in response to the B0 field, the transverse magnetization, and the pulsed field gradient, wherein said measured echoes include the azimuth-dependent sensitivity;
processing said measured echoes to compute an indication of a parameter of the earth formation at multiple azimuthal orientations about the circumference.

2. The method of claim 1, wherein the echoes for a given azimuthal orientation are detected using a CPMG pulse train with alternating 180x and 180y phase refocusing pulses.

3. The method of claim 1, wherein the echoes for a given azimuthal orientation are detected using a CPMG pulse train with only 180y phase refocusing pulses.

4. The method of claim 1, further comprising measuring a toolface angle, θ, during a pulse sequence comprising at least the application of the pulsed field gradient.

5. The method of claim 1, comprising acquiring additional echoes at different azimuthal orientations within the earth formation by applying the pulsed field gradients at different azimuthal orientations within the earth formation.

6. The method of claim 5, wherein said processing the echoes comprises using an inversion algorithm to generate estimates of an azimuth dependent T2 distribution.

7. The method of claim 6, wherein the inversion algorithm first computes an estimate of the spatially varying phase shift and second computes, from this estimate, the azimuth dependent T2 distribution.

8. The method of claim 7, wherein Fourier coefficients employed in the operation of the inversion algorithm are not dependent on time.

9. The method of claim 1, wherein said processing the echoes is performed in accordance with a forward model based on: $M_t(\theta_j) = \int_0^{2\pi} M_t(\psi) k(\theta_j - \psi) d\psi$, where $\psi$ is the formation angle, $M_t(\theta_j)$ denotes the measured data at time t when the one or more additional coils points to angle $\theta_j$ at the time the additional magnetic field is generated, and $\theta_j$ denotes the angle of the toolface of the tool with respect to the formation.

10. The method of claim 1, wherein the time-dependent kernel used in processing the signals is given by $(\theta_j - \psi) = e^{-i\gamma \Delta t B(\theta_j - \psi) A_j}$, where $A_j$ refers to a current fired through the one or more additional coils, $\gamma$ and $\Delta t$ are constants, $B(\theta_j - \psi)$ is a known B field per 1 ampere of current, and $\theta_j$ denotes the angle of the toolface of the tool.

11. The method of claim 1, wherein a relative standard deviation of data reconstructed from the processed echoes depends on a rate of rotation of the NMR tool.

12. The method of claim 1 comprising varying one or both of a pulse strength or a pulse width of the modulated DC pulses imprint different magnetization profiles for different acquisition sequences and allow azimuthal orientations to be resolved.

13. The method of claim 1, wherein applying the modulated DC pulses comprises matching a wavelength associated with an encoding pulse to a desired resolution.

14. The method of claim 1, wherein the one or more additional coils comprise two or more radially offset coils.

15. The method of claim 1, wherein the echoes are acquired at multiple orientations to improve resolution.

16. The method of claim 1, wherein:
the magnetic field $B_0$ generated by the permanent magnet is radial and directed away from a center of the permanent magnet; and
the one or more APEC coils are configured to generate a field that is collinear with $B_0$ on a first azimuthal side of the NMR tool, anti-parallel to $B_0$ on an azimuthal side opposing the first azimuthal side, and perpendicular to $B_0$ at azimuthal side perpendicular to the first azimuthal side.

* * * * *